United States Patent Office 3,574,522
Patented Apr. 13, 1971

3,574,522
IN SITU CATALYSIS OF THE REACTION OF CELLULOSE WITH UNSATURATED COMPOUNDS
Stanley P. Rowland, New Orleans, and Mary Ann F. Brannan, Metairie, La., assignors to the United States of America as represented by the Secretary of Agriculture
No Drawing. Filed Oct. 7, 1968, Ser. No. 765,613
Int. Cl. D06m 13/12, 13/28, 13/40
U.S. Cl. 8—116.2                                                   12 Claims

ABSTRACT OF THE DISCLOSURE

The present invention relates to novel processes by which substituent groups and crosslinks can be introduced into cellulose and other polymeric compositions containing reactive hydroxyl groups. The novel processes of this invention and the novel product of this invention are based on the discovery that quarternary ammonium and tertiary amino hydroxide groups developed as substituents in polymeric compositions, catalyze the reaction of activated vinyl compounds with the hydroxyl groups of these polymers.

---

A non-exclusive, irrevocable, royalty-free license in the invention herein described, throughout the world for all purposes of the United States Government, with the power to grant sublicenses for such purposes, is hereby granted to the Government of the United States of America.

An object of this invention is to develop unique chemically modified polymeric compositions derived from hydroxyl containing polymers. A further object of this invention is to provide a process whereby activated vinyl compounds or precursors of activated vinyl compounds may be caused to undergo reaction with hydroxyl containing polymers in the absence of external catalysis.

Prior art processes are known for the preparation of quaternary ammonium cotton and for the preparation of diethylaminoethylated cotton. Hoffpauir and Guthrie (Hoffpauir, C. L., and Guthrie, J. D., Textile Research Journal 20, 617 (1950)) converted some of the tertiary amino groups to quaternary groups by refluxing with 10% $CH_3I$ solution in absolute ethanol. Diethylaminoethylated cotton can be prepared by the method of Hartman (Hartman, M., U.S. Pat. 1,777,790, Oct. 7, 1930). It is also known in the prior art that mono and diepoxides are capable of reacting with a tertiary amine hydrohydroxide to form the free amine which can react with another mole of the epoxide to form the quarternary salt which in turn reacts with additional epoxide to form a polymeric substance.

This invention relates to a process whereby quaternary ammonium hydroxide groups and tertiary amino hydroxide groups, developed as substituents in polymeric compositions, catalyze the reaction of activated vinyl compounds with the hydroxyl groups of these polymers. The reactions may be carried out with the activated vinyl compound dissolved or dispersed in an aqueous system and organic medium or with the neat reagent.

The processes described in this disclosure may be applied to hydroxyl containing polymers such as starch, cellulose, polyvinyl alcohol, and the like when these are in the form of fibers, filaments, yarns, or fabrics. The reaction involved is that represented in Equation I:

$$XCH=CH_2 + HOP \rightarrow XCH_2CH_2OP$$

where X represents an activating group in a compound which is an "activated vinyl compound" and P represents a polymeric structure or a segment of a polymeric structure. The activated polyvinyl compound may be introduced into the reaction as such or it may be generated in the reaction mixture as the result of thermal decomposition as indicated in Equation II:

$$X-CH_2CH_2OR \rightarrow XCH=CH_2 + ROH$$

where R in this equation represents an H or an alkyl group.

Depending upon the conditions under which the reaction is conducted, the chemical reaction illustrated in Equation I may be accompanied to a greater or lesser extent by development of polymeric side chains or graft polymeric units in the cellulose (or other hydroxyl containing polymers) and this is illustrated in Equation III:

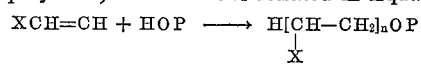

By the process of this invention an internally catalyzed reaction of the quaternary cottons with di- or polyfunctional reagents to develop resilience is possible. The compositions which result from the "wet cure" reactions with divinyl sulfone at room temperature can be subjected to a re-cure or a delayed cure at elevated temperatures with developments of very high and attractive wrinkle recovery angles. In addition, it is possible by virtue of the activity of the in situ catalyst to insert or remove durable creases by the process of heating the cotton in the creased or uncreased form.

When monofunctional reagents are employed in reactions with quaternary cotton, the result is a simple addition product or a grafting reaction. Both of these are novel results with this type of compound via internal catalysis. The grafting reaction aspect of this invention is novel and represents a new means for introducing a multitude of rather short graft chains.

Diethylaminoethylated (DEAE) cellulose is a weak base and, as such, would not be expected to catalyze the reaction of these activated vinyl compounds with cellulose. It was surprising, therefore, that it was possible to obtain some reaction of these activated vinyl compounds with cellulose via internal catalysis based on the weak-base DEAE substituent.

Activated vinyl compounds which can be used by the process of this invention include divinyl sulfone, bis-(2-hydroxyethyl) sulfone, acrylonitrile, methyl vinyl ketone, methyl vinyl sulfone, ethyl vinyl sulfone, ethyl vinyl ketone, fumaronitrile, acrylamide, maleimide, tributylvinylphosphonium halide and 1-acryloylpiperidine.

The following examples illustrate but do not limit the scope of this invention. All percentages are by weight.

EXAMPLE 1

A 4" x 4" sample of cotton fabric treated with glycidyltrimethylammonium chloride under alkaline conditions, nitrogen content 0.66%, is put into its basic form by a 15 min. soak in 0.05 N NaOH followed by rinses in de-ionized water. The fabric is squeezed to 100% wet pickup and while still wet, is thoroughly soaked in 50 g. of aqueous solution containing 12% divinyl sulfone. The cloth is wrung to approximately 100% wet pickup and placed into a polyethylene bag for one hour. The fabric is rinsed in cool tap water, 1% acetic acid, and finally distilled water. Sulfur content of the resulting product: 3.17%. Wrinkle recovery angles are 97.5° conditioned and 153.0° wet in the warp direction. Wrinkle recovery angles of the noncrosslinked quaternary cotton are 52.5° conditioned and 92.5° wet.

80 x 80 cotton printcloth treated with 12% divinyl sulfone for one hour and rinsed as described above, gives a product which shows essentially zero content of sulfur and wrinkle recovery angles similar to those of the original cotton fabric.

80 x 80 cotton printcloth treated with divinyl sulfone (12%) in the presence of 10% NaOH for one hour, and rinsed in tap water, 1% acetic acid, and distilled water, as described above, gives a product with 4.5% sulfur content; wrinkle recovery angles are 103° conditioned and 160° wet, in the warp direction.

EXAMPLE 2

A 4" x 4" sample of diethylaminoethyl cotton, nitrogen content: 0.8%, which is quaternized with epichlorohydrin is put into its basic form by the procedure described above in Example 1. The wet fabric is thoroughly soaked in 50 g. of aqueous solution containing 20% by weight of bis(hydroxyethyl) sulfone. The cloth is wrung to approximately 100% wet pickup and cured 5 min. at 140° C. in a forced draft oven. The resulting fabric is rinsed in cool tap water, 1% acetic acid, and finally in distilled water. Sulfur content of the product: 0.93%. Wrinkle recovery angles are 142.3° conditioned and 129.7° wet in the warp direction. Wrinkle recovery angles of the quaternary cotton prior to reaction with bis(2-hydroxyethyl)sulfone are 153.3° conditioned and 121.0° wet.

EXAMPLE 3

An 8" x 20" sample of quaternary ammonium cotton (0.56% N content) prepared by soaking 15% NaOH-impregnated cotton fabric for 24 hr. in an aqueous solution of 10% glycidyltrimethylammonium chloride, is put into its basic form and rinsed and squeezed as described in Example 1. It is padded through a 20% aqueous solution of bis(2-hydroxyethyl) sulfone (95% wet pickup) and cured 5 min. at 140° C. in a forced air oven. After tap water, 1% acetic acid, and distilled water rinses, the resulting fabric contains 1.48% sulfur; wrinkle recovery angles are as follows: 140.3° conditioned and 136.7° wet in the warp direction. Wrinkle recovery angles of the noncrosslinked quaternary ammonium cotton are 83.3° conditioned and 102.7° wet in the warp direction.

80 x 80 cotton printcloth padded with 20% bis(2-hydroxyethyl)sulfone solution and cured and rinsed as described above gave no sulfur add-on and no change in wrinkle recovery cycles.

80 x 80 cotton printcloth treated with 20% bis(2-hydroxyethyl)sulfone containing 2% $Na_2CO_3$ and cured and rinsed as described above gave 2.27% sulfur in the resulting product; wrinkle recovery angles are as follows: 112.3° conditioned and 108.0° wet in the warp direction.

EXAMPLE 4

A 2" x 3" sample of fabric treated with 3-chloro-2-hydroxypropyltrimethylammonium chloride in the presence of 20% NaOH, nitrogen content 0.45%, is put into its basic form as described above in Example 1. It is squeezed to 100% wet pickup of de-ionized water and added to 4 times its weight of acrylonitrile which has been preheated to 30° C. in a constant temperature bath. After 16 hours at 30° C., the sample is rinsed as described in Example 1. Nitrogen content of the resulting product is 10.50%, corresponding to an add-on of acrylonitrile of 39.7%.

EXAMPLE 5

Six 2" x 3" samples of diethylaminoethyl cotton, prepared from diethylaminoethyl chloride hydrochloride in the presence of 8% NaOH, nitrogen content 0.45%, which has been quaternized with methyl iodide, are put into the basic form and squeezed to 100% wet pickup as described above in Example 1. Each sample is added to 4 times its weight of an aqueous solution containing 12.5% maleimide and 25.0% dimethylsulfoxide which has been preheated to 30° C. At 1 min., 5 min., 30 min., 2.5 hr., 7.5 hr., and 16.0 hr., samples were rinsed as described above in Example 1. Nitrogen contents of the resulting products were 0.49, 0.52, 0.57, 0.58, 0.62, and 0.59%, respectively.

EXAMPLE 6

Six 2" x 3" pieces of the quaternary ammonium cotton fabric described in Example 4 were put into the strong base form, rinsed and squeezed as described in Example 1, and reacted with methyl vinyl ketone in a solution containing 12.5% methyl vinyl ketone, 67.5% dimethylsulfoxide, and 20.0% water, in the manner described in Example 5. After 1 min., 5 min., 30 min., 2.5 hr., 7.5 hr., and 16.0 hr. reaction times, weight add-ons of the resulting products were 0.0, 2.0, 10.9, 16.5, 17.9, and 18.2%, respectively.

EXAMPLE 7

Six 2" x 3" pieces of the quaternary ammonium cotton described in Example 5 (0.45% nitrogen content) were reacted with acrylamide (12.5% aqueous solution) in the manner described in Example 5. Nitrogen contents of the resulting products after 1 min., 5 min., 30 min., 2.5 hr., 7.5 hr., and 16.0 hr. of reaction at 30° C. were 0.45, 0.48, 0.49, 0.58, 0.78, and 1.00%, respectively.

EXAMPLE 8

Other vinyl compounds which can be reacted with quaternary ammonium hydroxide cottons in the manner described in Example 5 include methyl vinyl sulfone, ethyl vinyl sulfone, N,N'-methylene-bisacrylamide, methacrylonitrile, fumaronitrile, 3-butenenitrile, and ethyl vinyl ketone.

EXAMPLE 9

Diethylaminoethyl cotton, 1.1% nitrogen, is quaternized with methyl iodide, as described in Example 5, and crosslinked with divinyl sulfone and rinsed as described in Example 1. Sulfur content: 3.5%. A 1" x 5" piece of this crosslinked quaternary ammonium cotton fabric and a corresponding untreated cotton control is buried in a rot bed according to the standard mildew and rot resistance test method AATCC30–1957T. After six days the crosslinked quaternary ammonium cotton control is still intact and retains a substantial amount of its original strength, whereas, the cotton control has disintegrated in the rot bed, and the pieces which remain intact retain only a small fraction of the original strength.

EXAMPLE 10

Methyltriethylammonium hydroxide cotton reacted with divinyl sulfone (that fabric described in Example 9 prepared by a one hour reaction at room temperature of 12% divinyl sulfone with the quaternary ammonium hydroxide cotton fabric) is cured 10 min. at 160° C. in a forced air oven. Conditioned wrinkle recovery angles $(W+F)$ are increased from 241.0° before oven curing to 312.7°; wet wrinkle recovery angles are only slightly decreased from 326.0° before oven curing to 316.3°. A similarly treated externally catalyzed 80 x 80 cotton printcloth (prepared from 12% divinyl sulfone in the presence of 10% NaOH, 4.5% final sulfur content, wet cured for one hour and then oven cured 10 min. at 160° C.), showed increases in wrinkle recovery angles $(W+F)$ of 18.7° conditioned and 10.4° wet.

EXAMPLE 11

Glycidyltrimethylammonium hydroxide cotton reacted with divinyl sulfone (that quaternary ammonium fabric described in Example 1) is wet with water, and a crease is ironed into the fabric using two 30-sec. creasing operations at 140–147° C. (this corresponds to an electric iron setting of "cotton") on a metal ironing surface. After five home launderings and drying cycles using hot water, ionic detergent, and a 4 lb. laundering load, the crease rating of the sample according to the AATCC visual crease rating method, is 4.3 compared to 1.7 for untreated cotton. A conventionally crosslinked formaldehyde cotton (Form C) exhibited a crease rating of 1.3 under these conditions.

The dinvinyl sulfone crosslinked quaternary ammonium cotton described above, cured 10 min. at 160° in a forced air oven to give a conditioned wrinkle recovery angle in the warp direction of 151.3° can be creased and laundered as described above to obtain a crease rated at 3.2, compared to 1.8 for untreated cotton, according to the AATCC standard. If the crease in the crosslinked cotton is heated further between glass plates for 15 minutes at 180°, the crease rating can be improved to 3.8, or if heated 45 minutes at 160°, 4.3, compared to 1.6 for untreated cotton.

This same divinyl sulfone crosslinked quaternary ammonium cotton prior to oven curing is creased as described above and heated further at 170° for 5 minutes to obtain a crease rating of 5.0 after five laundering and drying cycles. This creased sample is soaked in water or dimethylsulfoxide and ironed flat at 145° for 60 seconds to reduce the crease rating to 3.5–3.8. If these samples are further heated in the flat state for 15 minutes at 170° C. in the presence of DMSO or water, the crease ratings are further reduced to 2.7 and 3.2, respectively. After 45 minutes at 170° in the flat state in the presence of DMSO the residual crease is rated at 2.3.

EXAMPLE 12

An 8" x 20" piece of 2-diethylaminoethyl (DEAE) cotton was prepared from a double treatment of cotton printcloth with a 20% aqueous solution of 2-diethylaminoethyl chloride hydrochloride in the presence of hot 8% NaOH: nitrogen content=1.10%; the sample is put into its base form by a 16-hr. soak in 200 ml. of 0.05 N NaOH, followed by rinses in de-ionized water. The fabric is squeezed to approximately 100% wet pickup, and while still wet, is padded through a 12% aqueous solution of divinyl sulfone, 2 dips and 2 nips. The wet fabric is placed in a polyethylene bag for 1 hr., rinsed in cool tap water, 1% acetic acid, and finally distilled water: sulfur content of the resulting product=1.6%. Wrinkle recovery angles $(W+F)$ conditioned 247°; wet 257°. When this fabric is subsequently cured 10 min. at 160° C. in a forced air oven, wrinkle recovery angles $(W+F)$ are increased to 285° conditioned and 277° wet. Wrinkle recovery angles of the non-crosslinked DEAE cotton are 150° conditioned and 138° wet $(W+F)$.

EXAMPLE 13

A 2" x 3" piece of 2-diethylaminoethyl cotton prepared from a single treatment of cotton fabric with 2-diethylaminoethyl chloride hydrochloride in the presence of 8% NaOH, 0.38% N, is put into the base form by soaking overnight in 50 ml. of 0.05 N NaOH followed by rinses in de-ionized water. It is squeezed to 100% wet pickup of de-ionized water and added to 4 times its weight of an aqueous solution containing 12.5% methyl vinyl ketone and 67.5% dimethylsulfoxide. After 16 hr. at 30° C., the fabric is rinsed in tap water, 1% acetic acid and distilled water. Weight add-on of the resulting product is 2.16%.

EXAMPLE 14

Six 2" x 3" samples of 2-diethylaminoethyl cotton, 0.38% nitrogen, in the base form are reacted with an aqueous solution of 12.5% fumaronitrile containing 80% dimethylsulfoxide in the manner described above in Example 13. After 1 minute, 5 minute, 30 minute. 2.5 hour, 7.5 hour, and 16.0 hour reaction periods, nitrogen contents of the resulting products are 0.41, 0.46, 0.46, 0.62, 0.93, and 1.13%, respectively.

EXAMPLE 15

A sample of quaternary ammonium cotton fabric prepared as described in Example 5 was put into the strong base form, rinsed, and squeezed as described in Example 1. This sample of cotton was reacted with methyl vinyl ketone by simple immersion of the wet cotton fabric into neat methyl vinyl ketone. At the end of a 16-hour reaction period at room temperature, the fabric had gained weight to the extent of 141%. Only a small fraction of this weight gain was removed by extraction of the sample of chemically modified cotton fabric with dimethylsulfoxide.

We claim:
1. A process of forming cross-linkages which are thermally reversible at household ironing temperatures in the fibers of a fabric which comprises:
   (a) treating a fabric composed of cellulosic fibers containing quaternary ammonium hydroxide or tertiary amino hydroxide substituent groups with an aqueous solution containing at least 1% divinyl sulfone,
   (b) storing the fabric in the wet state to effect reaction and,
   (c) washing the fabric to remove residual reactant.
2. The process of claim 1 wherein the fabric treated is composed of fibers having quaternary ammonium hydroxide substituent groups.
3. The process of claim 1 wherein the fabric treated is composed of fibers having tertiary amino hydroxide groups.
4. A process of forming cross-linkages which are thermally reversible at household ironing temperatures in the fibers of a fabric which comprises:
   (a) treating a fabric composed of cellulosic fibers containing quaternary ammonium hydroxide or tertiary amino hydroxide substituent groups with an aqueous solution containing at least 1% bis-(2-hydroxyethyl) sulfone,
   (b) heating the fabric at elevated temperatures to effect reaction and,
   (c) washing the fabric to remove residual reactant.
5. The process of claim 4 wherein the fabric treated is composed of fibers having quaternary ammonium hydroxide substituent groups.
6. The process of claim 4 wherein the fabric treated is composed of fibers having tertiary amino hydroxide substituent groups.
7. A process of chemically modifying a fabric which comprises:
   (a) treating a fabric composed of cellulosic fibers containing quaternary ammonium hydroxide or tertiary amino hydroxide substituent groups with an aqueous solution containing at least 1% of an activated vinyl compound selected from the group consisting of methyl vinyl ketone, acrylonitrile, methyl vinyl sulfone, ethyl vinyl ketone, fumaronitrile, acrylamide, maleimide, tributylvinylphosphonium halide, and 1-acryloylpiperidine,
   (b) storing the fabric in wet state to effect reaction and,
   (c) washing the fabric to remove residual reactant.
8. The process of claim 7 wherein the fabric treated is composed of fibers having quaternary ammonium hydroxide substituent groups.
9. The process of claim 7 wherein the fabric treated is composed of fibers having tertiary amino hydroxide substituent groups.
10. The product produced by the process of claim 2.
11. The product produced by the process of claim 4.
12. The product produced by the process of claim 7.

References Cited

Soignet et al. Journal of Applied Polymer Science, vol. 11, pp. 1155–1172 (1967).

GEORGE F. LESMES, Primary Examiner

JAMES CANNON, Assistant Examiner

U.S. Cl. X.R.

8—120; 260—233.3, 91.3, 231